(12) United States Patent
Bao et al.

(10) Patent No.: US 11,155,313 B2
(45) Date of Patent: Oct. 26, 2021

(54) HIGH-LOAD EXPLOSION-PROOF DRIVING DEVICE

(71) Applicants: Shandong Guoxing Intelligent Technology Co., Ltd., Yantai (CN); Shandong Atu Robot Technology Co., Ltd., Yantai (CN)

(72) Inventors: Terry Bao, Yantai (CN); Hongxiu Sun, Yantai (CN); Xibin Li, Yantai (CN); Wentao Liu, Yantai (CN); Tingting Guo, Yantai (CN); An Zheng, Yantai (CN); Lifu Duan, Yantai (CN); Linping Zhao, Yantai (CN)

(*) Notice: Subject to any disclaimer, the term of this patent is extended or adjusted under 35 U.S.C. 154(b) by 0 days.

(21) Appl. No.: 17/200,030

(22) Filed: Mar. 12, 2021

(65) Prior Publication Data
US 2021/0245823 A1 Aug. 12, 2021

Related U.S. Application Data

(63) Continuation of application No. PCT/CN2020/077377, filed on Mar. 2, 2020.

(30) Foreign Application Priority Data

Feb. 10, 2020 (CN) .......................... 202010084933.9

(51) Int. Cl.
*B62D 55/125* (2006.01)
*B62D 55/06* (2006.01)
*B25J 5/00* (2006.01)

(52) U.S. Cl.
CPC ........... *B62D 55/06* (2013.01); *B62D 55/125* (2013.01); *B25J 5/005* (2013.01)

(58) Field of Classification Search
CPC ......... B62D 55/06; B62D 55/125; B62J 5/005
See application file for complete search history.

(56) References Cited

U.S. PATENT DOCUMENTS 3,978,935 A * 9/1976 Dauwalder .......... B62D 55/125
180/9.62
5,401,218 A * 3/1995 Rassieur .............. B62D 55/125
180/9.62

FOREIGN PATENT DOCUMENTS

CN 108890613 A * 11/2018
CN 108890613 A 11/2018
(Continued)

OTHER PUBLICATIONS

Office Action of CN 202010084933.9 dated Sep. 8, 2020.
Notice of Allowance of CN 202010084933.9 dated Nov. 24, 2020.

*Primary Examiner* — Jacob D Knutson
(74) *Attorney, Agent, or Firm* — W&K IP

(57) ABSTRACT

The present invention discloses a high-load explosion-proof driving device, including a servo motor, a reduction box, and a power take-off assembly. The power take-off assembly includes a step sleeve, a coupling, a wheel support sleeve, and a driving wheel. The step sleeve is connected to a robot body, the coupling is disposed through the step sleeve, and a bearing structure and a sealing structure are provided between the coupling and the step sleeve. The coupling is provided with a driving wheel key and a driving wheel sleeve on the left, the driving wheel key is connected to the driving wheel sleeve, and the driving wheel sleeve is connected to the driving wheel. The present invention has the following advantages: the driving device has a high protection capability, and at the same time, power transmitted from the reduction box is distributed, thereby improving loading capability of a mobile chassis.

6 Claims, 5 Drawing Sheets

(56) References Cited

FOREIGN PATENT DOCUMENTS

CN 208756849 U * 4/2019
CN 208756849 U   4/2019

* cited by examiner

HIGH-LOAD EXPLOSION-PROOF DRIVING DEVICE

CROSS-REFERENCE TO RELATED APPLICATIONS

This application is a continuation of International Application No. PCT/CN2020/077377 with a filling date of Mar. 2, 2020, designating the United states, and further claims to the benefit of priority from Chinese Application No. 2020/10084933.9 with a filing date of Feb. 10, 2020. The content of the aforementioned applications, including any intervening amendments thereto, are incorporated herein by reference.

TECHNICAL FIELD

The present invention relates to the field of mobile driving mechanisms for tracked special robots, and particularly to a high-load explosion-proof driving device.

BACKGROUND

Current conventional power drive schemes for mobile robots mainly fall into two categories: a hub drive scheme and power motor-reduction box direct connection scheme.

(1) Hub drive scheme: A motor is arranged on a hub to directly drive a gear train to drive robots to move. For example, in the mobile chassis and the robot published in the invention patent with application number 2019/10345532.1, the mobile chassis includes a housing and at least two driving mechanisms. Each of the at least two driving mechanisms includes a swing rod, a shock absorber, and a hub motor. An upper end of the shock absorber is hinged on the housing, a lower end of the shock absorber is hinged on a first end of the swing rod, the first end of the swing rod is connected to a fixed base included in the hub motor, and a second end of the swing rod is hinged on the housing. A triangular arrangement is provided among the second end of the swing rod, the upper end of the shock absorber, and the fixed base included in the hub motor. The application solves the technical problem of poor power driving and bidirectional travel performance of the mobile chassis in the related art.

(2) Power motor-reduction box direct connection scheme: A servo motor is used to directly drive a reduction box, and a power shaft of the reduction box is directly connected to a driving wheel to drive a mobile chassis. For example, a variable-gear tracked robot chassis published in the utility model patent with application number 201721691837.0 includes a chassis bracket, a tracked walking mechanism symmetrically connected on two sides of the chassis bracket, a motor, a gearbox, and a reduction box. One end of the gearbox is connected to the motor on the same side through an input flange, and the other end of the gearbox drives the reduction box on the same side through an output flange. An output shaft of the reduction box drives the tracked walking mechanism on the same side. According to the technical solution, a gearbox is disposed on a chassis bracket, so that a robot can increase an output torque or a running speed according to road conditions, thereby improving the endurance mileage of running of a tracked chassis.

At present, a mobile driving mechanism for tracked special robots mainly relies on a power driving system consisting of a motor, a reduction box, and an output shaft. However, with increased robot loads and poor working environments, more challenges are presented to load requirements and protection levels of a robot power-driven system. For example, a common scheme of directly connecting a reduction box through an output shaft of a servo motor cannot meet the load requirements, and a robot is prone to failures such as a stuck shaft under a large load. Certainly, the scheme does not meet explosion-proof performance requirements and cannot be applied to poor working environments.

SUMMARY OF THE INVENTION

Based on the above technical problems, the present invention provides a high-load explosion-proof driving device.

A technical solution adopted by the present invention is as follows:

A high-load explosion-proof driving device includes a servo motor, a reduction box, and a power take-off assembly. A power take-off shaft of the servo motor is connected to the reduction box, and a power take-off shaft of the reduction box is connected to the power take-off assembly.

The power take-off assembly includes a step sleeve, a coupling, a wheel support sleeve, and a driving wheel.

The step sleeve includes a casing and a flat flange located on a right side of the casing. The flat flange is connected to a robot body. The coupling passes through a central round hole of the step sleeve. A first bearing structure and a first sealing structure are provided between the coupling and the step sleeve. Rotating dynamic seal is formed between the coupling and the step sleeve.

The coupling is provided with a reduction-box flat key on the right, and a right end of the coupling is connected to the power take-off shaft of the reduction box through the reduction-box flat key. The coupling is provided with a driving wheel key on the left, and the coupling is further externally provided with a driving wheel sleeve on the left. The driving wheel key is matched with and connected to the driving wheel sleeve, and the driving wheel sleeve is connected to the driving wheel.

The wheel support sleeve is disposed on an outer side of the casing of the step sleeve, and the left side of the wheel support sleeve is connected to the driving wheel. A second bearing structure is provided between the wheel support sleeve and the casing, and a second sealing structure is provided between the right side of the wheel support sleeve and the casing.

Preferably, the first bearing structure includes a first deep groove ball bearing and a third deep groove ball bearing, the first deep groove ball bearing and the third deep groove ball bearing being respectively arranged between two sides of the step sleeve and the coupling; the first sealing structure includes a first seal ring; and the coupling is provided with a groove for assembling the first deep groove ball bearing, the third deep groove ball bearing, and the first seal ring.

Preferably, the second bearing structure includes an angular contact ball bearing and a second deep groove ball bearing, the angular contact ball bearing is mounted at a left position of the wheel support sleeve, and a bearing inner spacer and a bearing outer spacer are provided between the angular contact ball bearing and the second deep groove ball bearing; and the second sealing structure includes a second seal ring.

Preferably, a driving wheel spacer is further provided between the driving wheel and the angular contact ball bearing, and the driving wheel spacer is mounted inside the wheel support sleeve.

Preferably, a bearing end cover is further provided between the driving wheel and the step sleeve, and different positions of the bearing end cover respectively collide with the angular contact ball bearing and the third deep groove ball bearing.

Preferably, a third seal ring is further provided between the flat flange of the step sleeve and the robot body.

Preferably, the coupling is further provided with a driving shaft baffle plate on the left, the driving shaft baffle plate is a circular plate, and a right side of the driving shaft baffle plate collides with edges of the driving wheel sleeve and the driving wheel key.

Preferably, the wheel support sleeve and the driving wheel as well as the driving wheel sleeve and the driving wheel are connected by bolts.

The present invention has the following beneficial technical effects:

In the present invention, a power take-off assembly is mounted behind the reduction box. The power take-off assembly includes a step sleeve, a coupling, and a wheel support sleeve, which, in conjunction with structural arrangement such as bearings, seal rings, and spacers inside the wheel support sleeve, implements protection characteristics of the driving device, meets explosion-proof requirements, also implements distribution of power transmitted from the reduction box, bears a shaft load, solves the problems such as a stuck shaft caused by a too large load of the driving wheel, and improves loading capability of a mobile chassis.

BRIEF DESCRIPTION OF DRAWINGS

The present invention is further described below with reference to drawings and specific embodiments.

DETAILED DESCRIPTION OF PREFERRED EMBODIMENTS

Figure 1:
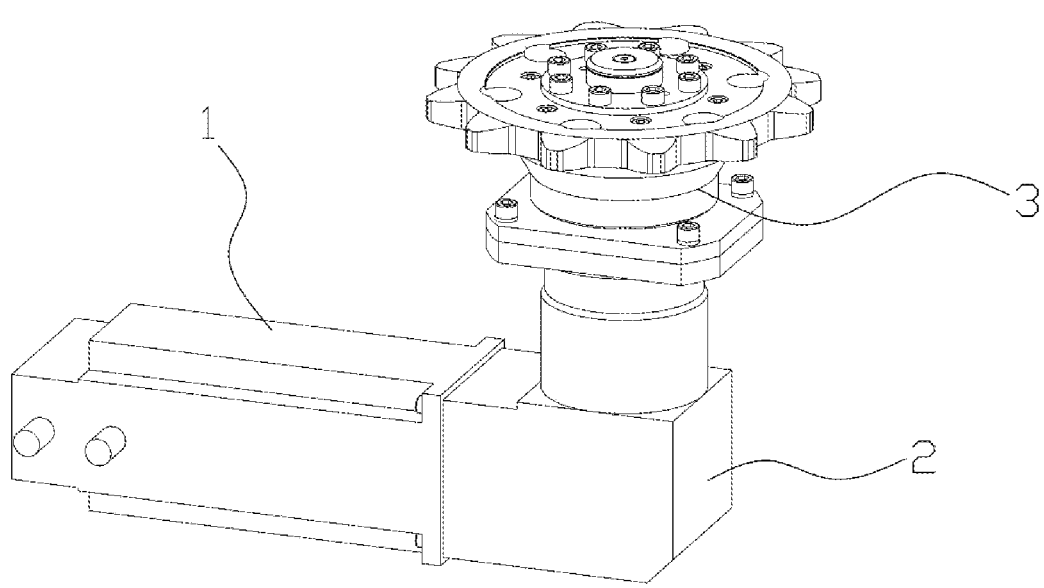
FIG. 1 is a schematic three-dimensional structural diagram of a high-load explosion-proof driving device according to the present invention.
Figure 2:
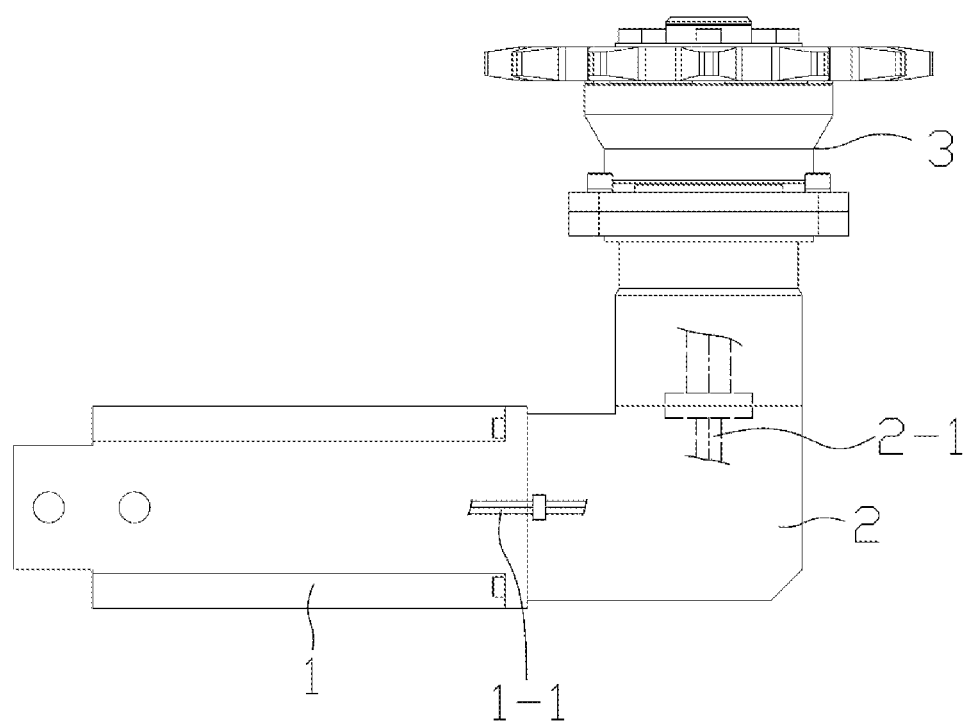
FIG. 2 is a front view of FIG. 1.
Figure 3:
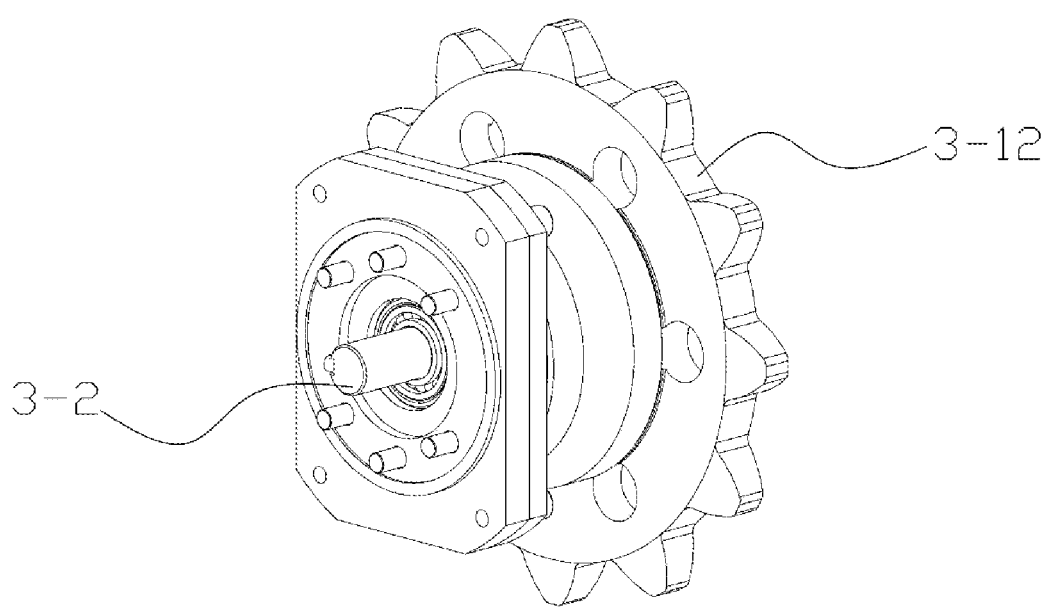
FIG. 3 is a schematic three-dimensional structural diagram of a power take-off assembly in the high-load explosion-proof driving device according to the present invention.
Figure 4:
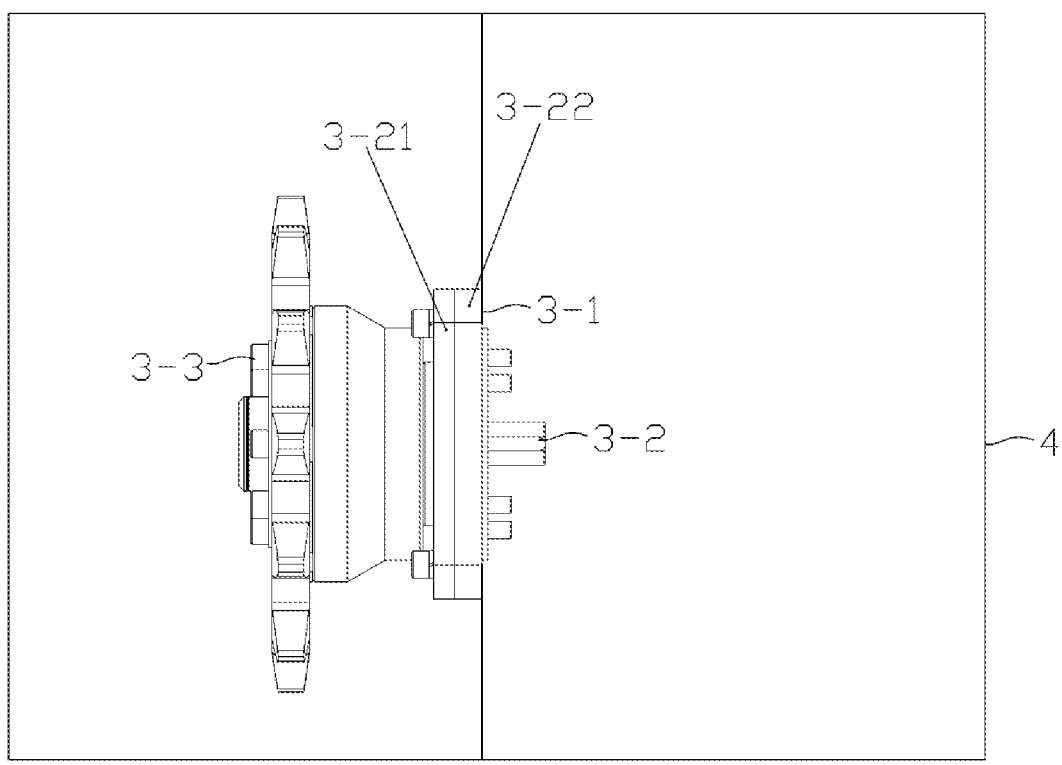
FIG. 4 is a front view of FIG. 3.
Figure 5:
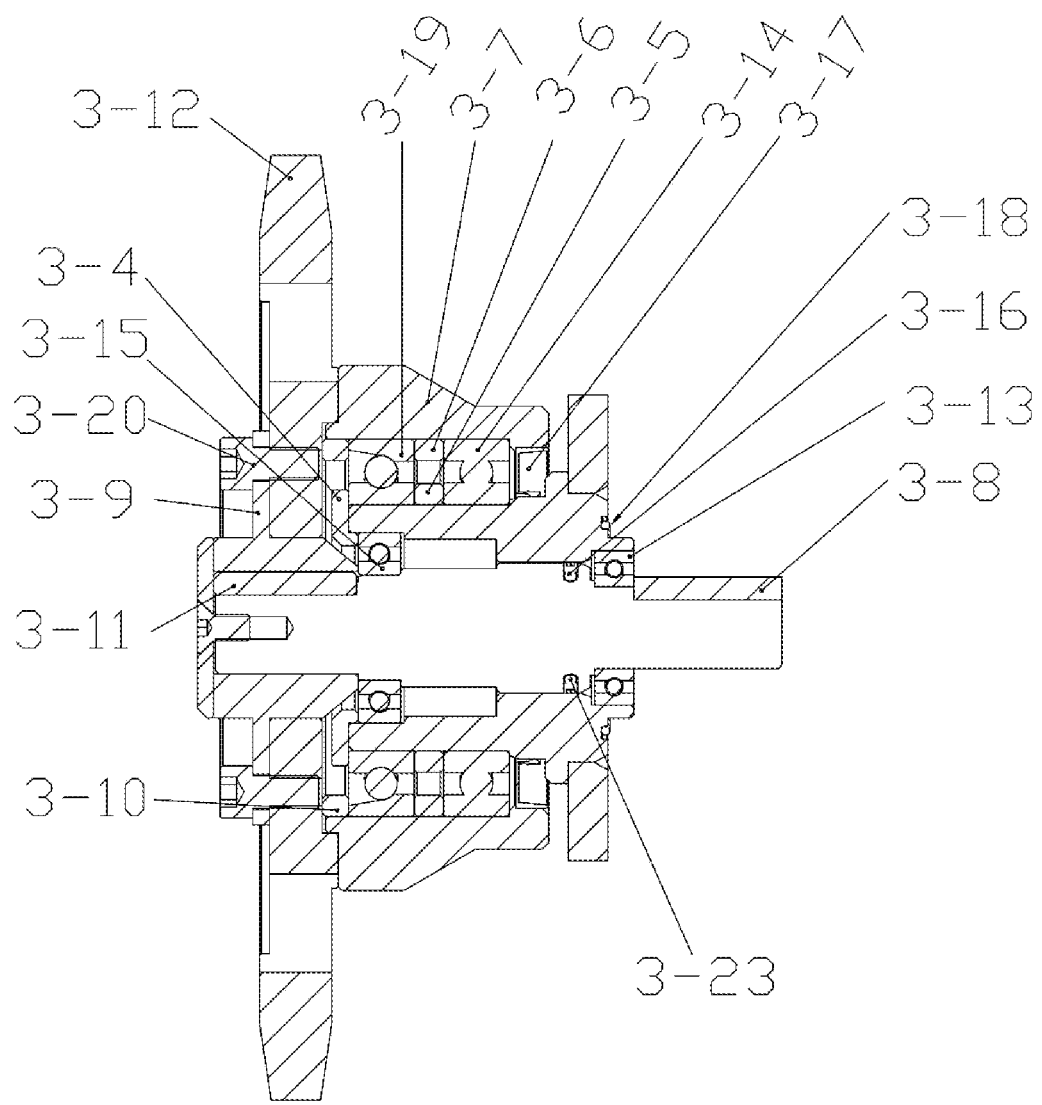
FIG. 5 is a schematic sectional structural diagram of the power take-off assembly in the high-load explosion-proof driving device according to the present invention.

Referring to the drawings, a high-load explosion-proof driving device is configured to improve loading and protection performance of a robot mobile chassis, and includes at least a servo motor 1, a reduction box 2, and a power take-off assembly 3. A power take-off shaft 1-1 of the servo motor 1 is connected to the reduction box 2, and a power take-off shaft 2-1 of the reduction box 2 is connected to the power take-off assembly 3.

The power take-off assembly 3 includes the following components: a step sleeve 3-1, a coupling 3-2, a driving shaft baffle plate 3-3, a bearing end cover 3-4, a bearing inner spacer 3-5, a bearing outer spacer 3-6, a wheel support sleeve 3-7, a reduction-box flat key 3-8, a driving wheel sleeve 3-9, a driving wheel spacer 3-10, a driving wheel key 3-11, a driving wheel 3-12, a first deep groove ball bearing 3-13, a second deep groove ball bearing 3-14, a third deep groove ball bearing 3-15, a first seal ring 3-16, a second seal ring 3-17, a third seal ring 3-18, an angular contact ball bearing 3-19, and a fixed screw 3-20.

The step sleeve 3-1 includes a casing 3-21 and a flat flange 3-22 located on a right side of the casing. The flat flange is connected to a robot body 4. The coupling 3-2 passes through a central round hole of the step sleeve. A first bearing structure and a first sealing structure are provided between the coupling and the step sleeve. Rotating dynamic seal is formed between the coupling and the step sleeve. The first bearing structure includes a first deep groove ball bearing 3-13 and a third deep groove ball bearing 3-15, the first deep groove ball bearing 3-13 and the third deep groove ball bearing 3-15 being respectively arranged between two sides of the step sleeve and the coupling. The first sealing structure includes a first seal ring 3-16. The coupling 3-2 is provided with a groove 3-23 for assembling the first deep groove ball bearing, the third deep groove ball bearing, and the first seal ring.

The coupling 3-2 is provided with a reduction-box flat key 3-8 on the right, and a right end of the coupling is connected to the power take-off shaft of the reduction box through the reduction-box flat key. The coupling is provided with a driving wheel key 3-11 on the left, and the coupling is further externally provided with a driving wheel sleeve 3-9 on the left. The driving wheel key 3-11 is matched with and connected to the driving wheel sleeve 3-9, and the driving wheel sleeve 3-9 is connected to the driving wheel 3-12 through a bolt.

The wheel support sleeve 3-7 is disposed on an outer side of the casing of the step sleeve 3-1, and the left side of the wheel support sleeve 3-7 is connected to the driving wheel 3-12 through a bolt. A second bearing structure is provided between the wheel support sleeve 3-7 and the casing, and a second sealing structure is provided between the right side of the wheel support sleeve and the casing. The second bearing structure includes an angular contact ball bearing 3-19 and a second deep groove ball bearing 3-14, the angular contact ball bearing 3-19 is mounted at a left position of the wheel support sleeve 3-7, and a bearing inner spacer 3-5 and a bearing outer spacer 3-6 are provided between the angular contact ball bearing 3-19 and the second deep groove ball bearing 3-14. The second sealing structure includes a second seal ring 3-17.

Various components of the power take-off assembly are respectively described below in detail to describe the present invention more specifically.

Specifically, the step sleeve 3-1 is a welded body of the casing and the flat flange on the right side. A middle round hole passes through the coupling 3-2 to form an explosion-proof joint surface. The wheel support sleeve 3-7 sleeves the left side of the step sleeve 3-1. The flat flange on the right side is connected to the robot body.

The coupling 3-2 is cylindrical, and is provided with an assembling groove or a sealing groove. After the third deep groove ball bearing 3-15 and the first sealing ring 3-16 are assembled, the coupling passes through the step sleeve 3-1 to form rotating dynamic seal, with a protection level of IP67, and the length and clearance of the joint surface formed with the step sleeve 3-1 meet second-class explosion-proof requirements. The driving wheel key 3-11 is mounted to the left side of the coupling, passes through the driving wheel sleeve 3-9, and is connected to the driving shaft baffle plate 3-3 through a bolt. The driving wheel key 3-11 is matched with and connected to the driving wheel sleeve 3-9, and the driving wheel sleeve 3-9 is connected to the driving wheel 3-12. The coupling is provided with the first deep groove ball bearing 3-13 and the reduction-box flat key 3-8 on the right.

The driving shaft baffle plate 3-3 is a circular plate with a hole in the middle, and is fixed to the left side of the coupling 3-2. The bearing end cover 3-4 is a circular structure, and the right side is connected to the step sleeve 3-1. The bearing inner spacer 3-5 is a circular structure, and is mounted on the casing of the step sleeve 3-1, with the angular contact ball bearing 3-19 and the deep groove ball bearing 3-14 positioned left and right respectively. The bearing outer spacer 3-6 is a ring-like structure, and is mounted on an inner side of the wheel support sleeve 3-7, with the angular contact ball bearing 3-19 and the deep groove ball bearing 3-14 positioned left and right respectively.

The wheel support sleeve 3-7 is a cylindrical hollow structure, with the angular contact ball bearing 3-19 and the second deep groove ball bearing 3-14 supporting the middle, and is rotatable around the casing of the step sleeve 3-1. The second sealing ring 3-17 is mounted inside the right side of the wheel support sleeve 3-7 to form a sealing structure with the casing of the step sleeve 3-1. The left side of the wheel support sleeve is also connected to the driving wheel 3-12 through a bolt.

The reduction-box flat key 3-8 is rectangular, and is mounted to a right end of the coupling 3-2 and connected to an inner hole of the power take-off shaft of the reduction box. The driving shaft sleeve 3-9 is a cylindrical hollow structure, with the middle passing through the coupling 3-2 and an outer side passing through and connected to the driving wheel 3-12. The driving wheel spacer 3-10 is a ring structure, and is mounted inside the wheel support sleeve 3-7 and between the driving wheel 3-12 and the angular contact ball bearing 3-19. The driving wheel key 3-11 is rectangular, and is mounted on the left side of the coupling 3-2 and passes through the driving wheel sleeve 3-9. The driving wheel 3-12 is gear-shaped with a round hole in the middle, and passes through the driving wheel sleeve 3-9. The right side of the driving wheel 3-12 is connected to the wheel support sleeve 3-7 through a bolt, and the driving wheel 3-12 rotates with the wheel support sleeve 3-7. The driving wheel 3-12 engages with a robot track.

The first deep groove ball bearing 3-13 is mounted to the right side of the coupling 3-2 and supports the step sleeve 3-1. The second deep groove ball bearing 3-14 is mounted on the support step sleeve 3-1 and supports the wheel support sleeve 3-7 together with the angular contact ball bearing 3-19. The third deep groove ball bearing 3-15 is mounted to the right side of the coupling 3-2 and supports the step sleeve 3-1. The angular contact ball bearing 3-19 is mounted on the support step sleeve 3-1 and supports the wheel support sleeve 3-7 together with the second deep groove ball bearing 3-14.

The first seal ring 3-16 is mounted between the casing of the step sleeve 3-1 and the coupling 3-2 to provide rotating dynamic seal. The second seal ring 3-17 is mounted between the casing of the step sleeve 3-1 and the wheel support sleeve 3-7 for dust prevention and water prevention. The third seal ring 3-18 is mounted between the flat flange of the step sleeve 3-1 and the robot body to provide static seal.

A plurality of fixed screws 3-20 are provided to connect the components of the power take-off assembly 3 and connect and fix the power take-off assembly 3 to the reduction box 2.

An operation process of the present invention is roughly as follows:

The servo motor 1 drives the coupling 3-2 to rotate through the reduction box 2, the coupling 3-2 drives the driving wheel 3-12 to rotate through the driving wheel key 3-11 and the driving wheel sleeve 3-9, and the driving wheel 3-12 engages with a robot track to drive a tracked robot to move. When the driving wheel 3-12 rotates, the wheel support sleeve 3-7 rotates along with it, and the step sleeve 3-1 is stationary.

In the present invention, a power take-off assembly 3 is mounted behind the reduction box. The power take-off assembly 3 includes a step sleeve 3-1, a coupling 3-2, and a wheel support sleeve 3-7, which, in conjunction with structural arrangement such as bearings, seal rings, and spacers inside the wheel support sleeve, implements protection characteristics of the driving device, meets explosion-proof requirements, also implements distribution of power transmitted from the reduction box, bears a shaft load, solves the problems such as a stuck shaft caused by a too large load of the driving wheel, and improves loading capability of a mobile chassis.

The parts not mentioned in the above methods can be implemented by adopting or drawing on existing technologies.

In the present invention, the terms "first," "second," and "third" are merely for the purpose of description, but cannot be understood as indicating or implying relative importance. The term "multiple" means two or more unless otherwise explicitly defined. The terms "mount," "connect with," "connect," "fix," and the like shall be understood in a broad sense. For example, "connect" may mean being fixedly connected, detachably connected, or integrally connected; and "connect with" may mean being directly connected or indirectly connected through an intermediary. For those of ordinary skill in the art, specific meanings of the above terms in the present invention can be understood according to specific situations.

In the description of the present invention, it should be understood that if orientation or position relations indicated by the terms such as "upper," "lower," "left," "right," "front," "back," and the like are based on the orientation or position relations shown in the drawings, and the terms are intended only to facilitate the description of the present invention and simplify the description, rather than indicating or implying that the apparatus or element referred to must have a particular orientation and be constructed and operated in the particular orientation, and therefore cannot be construed as a limitation on the present invention.

The above are merely preferred embodiments of the present invention and are not intended to limit the present invention. The present invention may be subject to changes and variations for those skilled in the art. Any modifications, equivalent replacements, and improvements made within the spirit and principles of the present invention shall all be encompassed in the protection scope of the present invention.

What is claimed is:

1. A high-load explosion-proof driving device, comprising a servo motor, a reduction box, and a power take-off assembly, a power take-off shaft of the servo motor being connected to the reduction box, and a power take-off shaft of the reduction box being connected to the power take-off assembly;

the power take-off assembly includes a step sleeve, a coupling, a wheel support sleeve, and a driving wheel; the step sleeve includes a casing and a flat flange located on a right side of the casing, the flat flange is connected to a robot body, the coupling passes through a central round hole of the step sleeve, a first bearing structure and a first sealing structure are provided between the coupling and the step sleeve, a rotating dynamic seal is formed between the coupling and the step sleeve;

the coupling is provided with a reduction-box flat key on the right, and a right end of the coupling is connected to the power take-off shaft of the reduction box through the reduction-box flat key, the coupling is provided with a driving wheel key on the left, and the coupling is further externally provided with a driving wheel sleeve on the left, the driving wheel key is matched with and connected to the driving wheel sleeve, and the driving wheel sleeve is connected to the driving wheel;

the wheel support sleeve is disposed on an outer side of the casing of the step sleeve, and a left side of the wheel support sleeve is connected to the driving wheel, a second bearing structure is provided between the wheel support sleeve and the casing, and a second sealing structure is provided between a right side of the wheel support sleeve and the casing;

the first bearing structure includes a first deep groove ball bearing and a third deep groove ball bearing, the first deep groove ball bearing and the third deep groove ball bearing being respectively arranged between two sides of the step sleeve and the coupling, the first sealing structure includes a first seal ring, and the coupling is provided with a groove for assembling the first deep groove ball bearing, the third deep groove ball bearing, and the first seal ring;

the second bearing structure includes an angular contact ball bearing and a second deep groove ball bearing, the angular contact ball bearing is mounted at a left position of the wheel support sleeve, and a bearing inner spacer and a bearing outer spacer are provided between the angular contact ball bearing and the second deep groove ball bearing, and the second sealing structure includes a second seal ring.

2. The high-load explosion-proof driving device according to claim 1, wherein a driving wheel spacer is further provided between the driving wheel and the angular contact ball bearing, and the driving wheel spacer is mounted inside the wheel support sleeve.

3. The high-load explosion-proof driving device according to claim 2, wherein a bearing end cover is further provided between the driving wheel and the step sleeve, and different positions of the bearing end cover respectively collide with the angular contact ball bearing and the third deep groove ball bearing.

4. The high-load explosion-proof driving device according to claim 1, wherein a third seal ring is further provided between the flat flange of the step sleeve and the robot body.

5. The high-load explosion-proof driving device according to claim 1, wherein the coupling is further provided with a driving shaft baffle plate on the left, the driving shaft baffle plate is a circular plate, and a right side of the driving shaft baffle plate collides with edges of the driving wheel sleeve and the driving wheel key.

6. The high-load explosion-proof driving device according to claim 1, wherein the wheel support sleeve and the driving wheel are connected by a first bolt, and the driving wheel sleeve and the driving wheel are connected by a second bolt.

* * * * *